(12) United States Patent
Lior et al.

(10) Patent No.: US 10,132,246 B2
(45) Date of Patent: Nov. 20, 2018

(54) BLEED VALVE ASSEMBLY

(71) Applicant: UNITED TECHNOLOGIES CORPORATION, Hartford, CT (US)

(72) Inventors: Raphael Lior, Brookline, MA (US); Mark G. Pavlik, Torrington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 108 days.

(21) Appl. No.: 14/771,289

(22) PCT Filed: Mar. 12, 2014

(86) PCT No.: PCT/US2014/023946
§ 371 (c)(1),
(2) Date: Aug. 28, 2015

(87) PCT Pub. No.: WO2014/159504
PCT Pub. Date: Oct. 2, 2014

(65) Prior Publication Data
US 2016/0010564 A1    Jan. 14, 2016

Related U.S. Application Data

(60) Provisional application No. 61/782,474, filed on Mar. 14, 2013.

(51) Int. Cl.
*F02C 7/232*    (2006.01)
*F02C 6/08*    (2006.01)
(Continued)

(52) U.S. Cl.
CPC ............... *F02C 9/18* (2013.01); *F01D 25/32* (2013.01); *F02C 6/08* (2013.01); *F02C 7/057* (2013.01);
(Continued)

(58) Field of Classification Search
CPC . F16K 31/50; F16K 27/02; F16K 1/34; F16K 24/04; F02C 9/18; F02C 7/232;
(Continued)

(56) References Cited

U.S. PATENT DOCUMENTS 2,823,699 A * 2/1958 Willis ................. G01L 19/0007
137/625.26
3,774,394 A    11/1973 Criffield
(Continued)

FOREIGN PATENT DOCUMENTS

| EP | 2202387 | 6/2010 | | |
| GB | 859713 A * | 1/1961 | ............. | F02C 7/232 |
| JP | WO 2012098627 A1 * | 7/2012 | ............. | F16K 31/06 |

OTHER PUBLICATIONS

The Extended European Search Report for EP Application No. 14775865.0, dated Oct. 14, 2016.
(Continued)

*Primary Examiner* — Marina Tietjen
(74) *Attorney, Agent, or Firm* — Carlson, Gaskey & Olds, P.C.

(57) ABSTRACT

A bleed valve assembly according to an exemplary aspect of the present disclosure includes, among other things, a bleed adaptor having an inlet portion, a fitting opposite the inlet portion, an adaptor body that extends between the inlet portion and the fitting, and a bleed opening disposed on the adaptor body that is selectively exposed to direct fluid into the bleed adaptor.

19 Claims, 4 Drawing Sheets

(51) Int. Cl.
| | |
|---|---|
| *F02C 9/18* | (2006.01) |
| *F01D 25/32* | (2006.01) |
| *F02C 7/057* | (2006.01) |
| *F02C 7/06* | (2006.01) |
| *F02C 9/52* | (2006.01) |
| *F16K 1/34* | (2006.01) |
| *F16K 24/04* | (2006.01) |
| *F16K 27/02* | (2006.01) |

(52) U.S. Cl.
CPC .............. *F02C 7/06* (2013.01); *F02C 7/232* (2013.01); *F02C 9/52* (2013.01); *F16K 1/34* (2013.01); *F16K 24/04* (2013.01); *F16K 27/02* (2013.01); *F05D 2220/32* (2013.01); *F05D 2260/606* (2013.01)

(58) Field of Classification Search
CPC .... F02C 9/52; F02C 7/057; F02C 7/06; F02C 6/08; F01D 25/32; F05D 2260/606; F05D 2220/32
USPC ........ 251/216–217, 318, 351, 353, 346–347; 188/352
See application file for complete search history.

(56) References Cited

U.S. PATENT DOCUMENTS

| | | | |
|---|---|---|---|
| 4,016,716 A | 4/1977 | Evans et al. | |
| 4,470,577 A * | 9/1984 | Warwick | B60T 11/30 188/352 |
| 4,744,391 A | 5/1988 | Lardner | |
| 4,834,140 A * | 5/1989 | Schmidt | B60T 11/30 137/381 |
| 4,846,212 A | 7/1989 | Scobie et al. | |
| 5,259,185 A | 11/1993 | Peterson | |
| 5,560,457 A * | 10/1996 | Rike | B60T 11/30 188/352 |
| 5,562,188 A | 10/1996 | Appelgren | |
| 6,695,578 B2 | 2/2004 | Winslow et al. | |
| 6,921,244 B2 | 7/2005 | Johnson | |
| 7,412,829 B2 * | 8/2008 | Matsushita | B60T 11/22 60/453 |
| 7,540,144 B2 | 6/2009 | Makuszewski | |
| 8,985,551 B2 * | 3/2015 | Matsuo | F16K 31/06 251/129.18 |
| 2003/0035719 A1 * | 2/2003 | Wadia | F01D 25/02 415/145 |
| 2005/0121642 A1 | 6/2005 | Purdy | |
| 2006/0090567 A1 | 5/2006 | Shamine | |
| 2007/0089429 A1 | 4/2007 | Makuszewski | |
| 2007/0234738 A1 | 10/2007 | Borcea | |
| 2010/0232935 A1 | 9/2010 | Twell | |

OTHER PUBLICATIONS

International Search Report and Written Opinion of the International Searching Authority for International application No. PCT/US2014/023946 dated Aug. 14, 2014.

* cited by examiner

BLEED VALVE ASSEMBLY

BACKGROUND

This disclosure relates generally to a tubing system, and more particularly, but not exclusively, to a bleed valve assembly that can be incorporated into a tubing system.

Gas turbine engines typically include at least a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Gas turbine engines may include tubing systems for circulating fluids from one engine location to another engine location. For example, fuel tubing systems may communicate fuel from a fuel tank to a combustion area of the gas turbine engine. Fluids such as air, mist, and/or fuel may enter into portions of the tubing system through fuel nozzles subsequent to engine shutdown. The fluid that enters the tubing system may need removed prior to running the engine again.

SUMMARY

A bleed valve assembly according to an exemplary aspect of the present disclosure includes, among other things, a bleed adaptor having an inlet portion, a fitting opposite the inlet portion, an adaptor body that extends between the inlet portion and the fitting, and a bleed opening disposed on the adaptor body that is selectively exposed to direct fluid into the bleed adaptor.

In a further non-limiting embodiment of the foregoing bleed valve assembly, the fluid includes at least one of air, mist and fuel.

In a further non-limiting embodiment of either of the foregoing bleed valve assemblies, a hose is connected to the fitting.

In a further non-limiting embodiment of any of the foregoing bleed valve assemblies, a nut and a threaded portion are located between the inlet portion and the fitting.

In a further non-limiting embodiment of any of the foregoing bleed valve assemblies, a seal is located between the nut and the threaded portion.

In a further non-limiting embodiment of any of the foregoing bleed valve assemblies, an inlet portion of the bleed adaptor is received against a seat of a tube boss to prevent the fluid from entering the bleed adaptor.

In a further non-limiting embodiment of any of the foregoing bleed valve assemblies, the bleed opening is disposed on the inlet portion.

In a further non-limiting embodiment of any of the foregoing bleed valve assemblies, the inlet portion of the bleed adaptor is selectively spaced from the seat to direct the fluid into the bleed opening.

In a further non-limiting embodiment of any of the foregoing bleed valve assemblies, an inlet portion of the bleed adaptor is moveable away from a seat of a tube boss to expose the bleed opening.

In a further non-limiting embodiment of any of the foregoing bleed valve assemblies, the bleed adaptor is threadably received by a tube boss.

A gas turbine engine according to an exemplary aspect of the present disclosure includes, among other things, a tubing system that circulates a fluid and a bleed valve assembly mounted to at least one tube portion of the tubing system. The bleed valve assembly includes a tube boss mounted to the at least one tube portion and a bleed adaptor connected to the tube boss. The bleed adaptor is movable between a first position and a second position relative to the tube boss to expose a bleed opening of the bleed adaptor to fluid inside the at least one tube portion.

In a further non-limiting embodiment of the foregoing gas turbine engine, the tubing system circulates at least one of airflow, fuel and lubricant.

In a further non-limiting embodiment of either of the foregoing gas turbine engines, an inlet portion of the bleed adaptor is received against a seat of the tube boss in the first position and is spaced from the seat in the second position.

In a further non-limiting embodiment of any of the foregoing gas turbine engines, the bleed adaptor is threadably connected to the tube boss.

In a further non-limiting embodiment of any of the foregoing gas turbine engines, the bleed opening is disposed on an inlet portion of the bleed adaptor.

In a further non-limiting embodiment of any of the foregoing gas turbine engines, a hose is connected to the bleed adaptor on an opposite side from the tube boss.

A method of bleeding fluid from a tubing system according to another exemplary aspect of the present disclosure includes, among other things, selectively exposing a bleed opening of a bleed adaptor that is connected to a tube portion of the tubing system and communicating fluid from inside of the tube portion into the bleed opening to remove the fluid from the tube portion.

In a further non-limiting embodiment of the foregoing method, the step of selectively exposing includes moving the bleed adaptor from a first position in which the bleed adaptor is received against a seat of a tube boss mounted to the tube portion and a second position in which the bleed adaptor is spaced from the seat.

In a further non-limiting embodiment of either of the foregoing methods, the step of communicating includes directing the fluid from the tube portion, through the bleed opening, and into a passage of the bleed adaptor.

In a further non-limiting embodiment of any of the foregoing methods, the method includes communicating the fluid through the bleed adaptor and then through a hose connected to the bleed adaptor.

The various features and advantages of this disclosure will become apparent to those skilled in the art from the following detailed description. The drawings that accompany the detailed description can be briefly described as follows.

DETAILED DESCRIPTION

Figure 1:
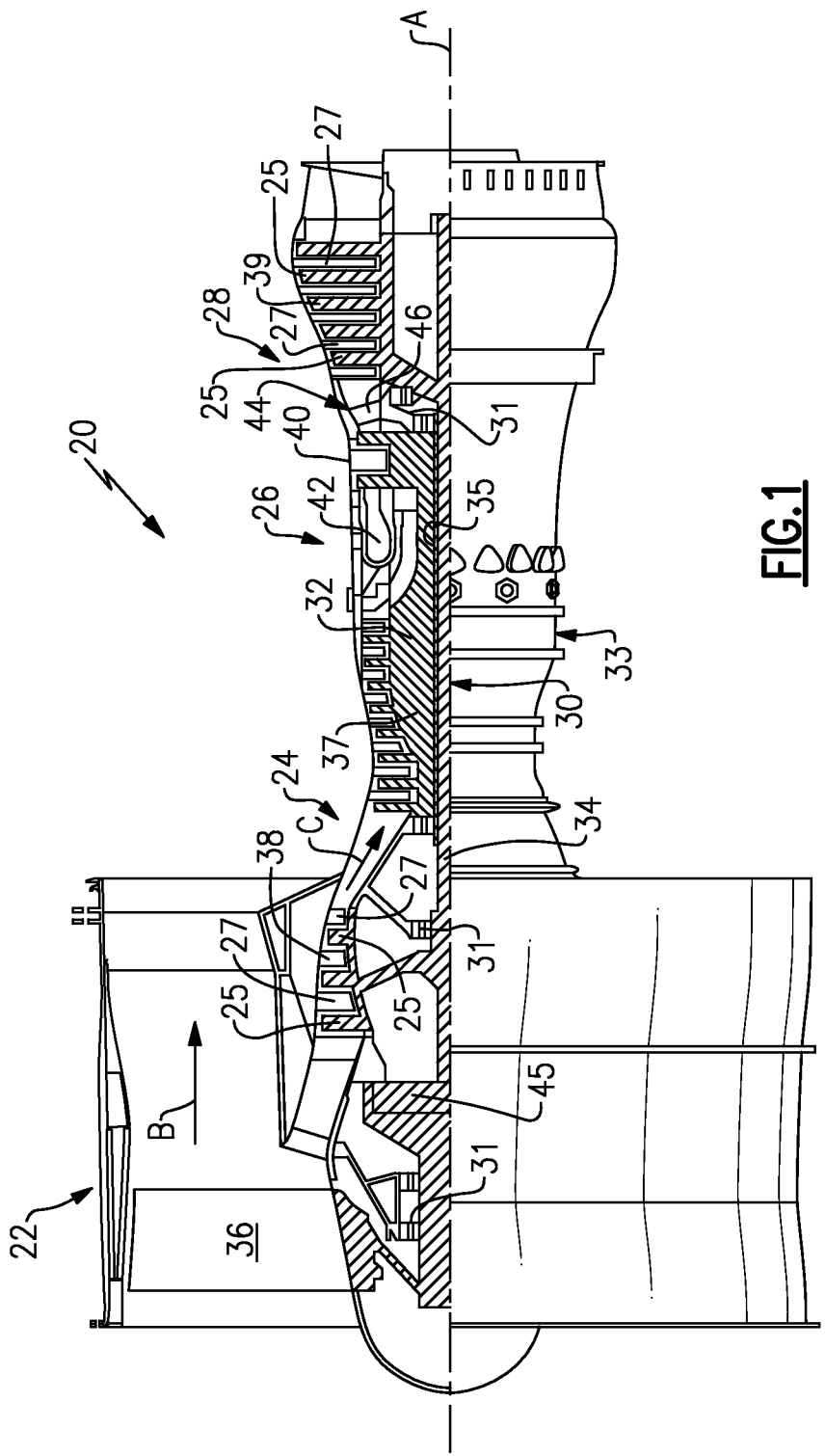
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only exemplary of one embodiment of a geared architecture engine and that the present disclosure is applicable to other gas turbine engines, including direct drive turbofans.

In this embodiment of the exemplary gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(Tram\ °R)/(518.7°\ R)]^{0.5}$. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 create or extract energy (in the form of pressure) from the core airflow that is communicated through the gas turbine engine 20 along the core flow path C. The vanes 27 direct the core airflow to the blades 25 to either add or extract energy.

Figure 2:
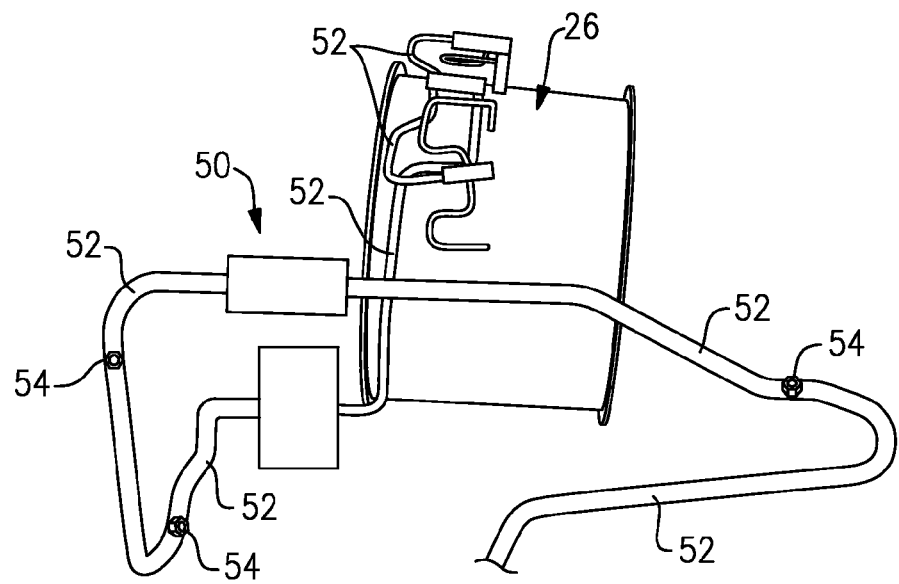
FIG. 2 illustrates a tubing system of a gas turbine engine.

FIG. 2 illustrates a tubing system 50 that can be incorporated into a gas turbine engine, such as the gas turbine engine 20 of FIG. 1. The tubing system 50 is configured to circulate a fluid, such as airflow, fuel, or lubricant (i.e., oil), from one engine location to another engine location. For example, in one non-limiting embodiment, the tubing system 50 communicates fuel from a fuel tank (not shown) to the combustor section 26 of the gas turbine engine 20. However, this disclosure is not intended to be limited to fuel tubing systems.

The tubing system 50 can include a plurality of tube portions 52 that communicate fluids throughout the gas turbine engine 20. One or more bleed valve assemblies 54 (shown schematically) may be connected to at least a portion of the tube portions 52 to remove fluid, such as air, mist, and/or fuel, out of the tubing system 50. Removal of fluids from the tubing system 50 may be necessary to reduce engine vibration and to prepare the engine for subsequent operation, among other reasons. An exemplary bleed valve assembly 54 configured to bleed fluid from the tubing system 50 is described in detail with reference to FIGS. 3, 4A and 4B.

Figure 3:
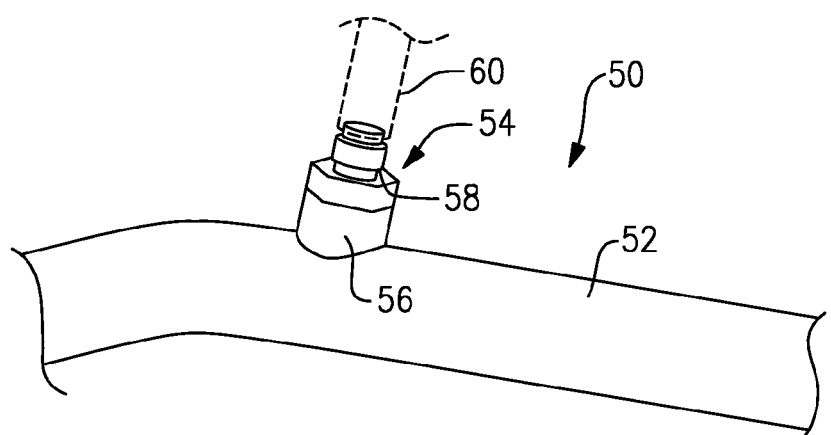
FIG. 3 illustrates a part of a gas turbine engine tubing system.

Referring to FIG. 3, an exemplary bleed valve assembly 54 may be mounted to a tube portion 52 of the tubing system 50. Although only one bleed valve assembly 54 is illustrated in this embodiment, the tubing system 50 could include multiple bleed valve assemblies dispersed at various locations of the tubing system 50. The amount and mounting locations of the bleed valve assemblies 54 are based on design specific parameters and are not intended to limit this disclosure.

In one embodiment, the bleed valve assembly 54 includes a tube boss 56 and a bleed adaptor 58 connected to the tube boss 56. The tube boss 56 may be welded or otherwise attached to the tube portion 52, and the bleed adaptor 58 can be threadably secured to the tube boss 56. Other connection methodologies may also be utilized in order to secure the components of the bleed valve assembly 54.

A hose 60 can optionally be attached to the bleed adaptor 58 on an opposite side of the bleed adaptor 58 from the tube boss 56. The bleed valve assembly 54 provides a mechanism for bleeding fluid (i.e., air, mist and/or fuel) located inside of the tube portion 52 through the bleed adaptor 58 and then through the hose 60 to remove the fluid from the tubing system 50.

Figure 4A:
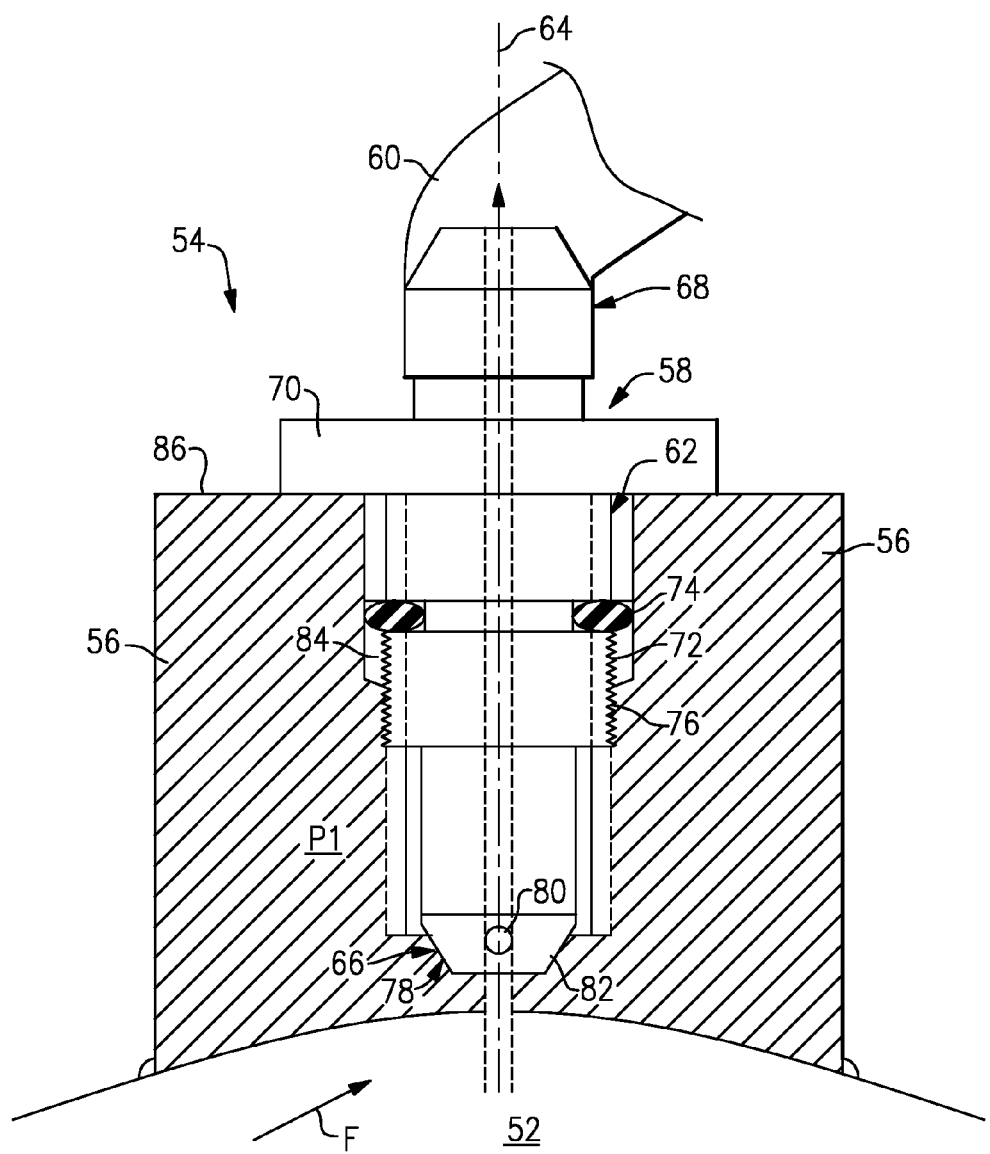
FIGS. 4A and 4B illustrate a bleed valve assembly that can be incorporated into a gas turbine engine tubing system.
Figure 4B:
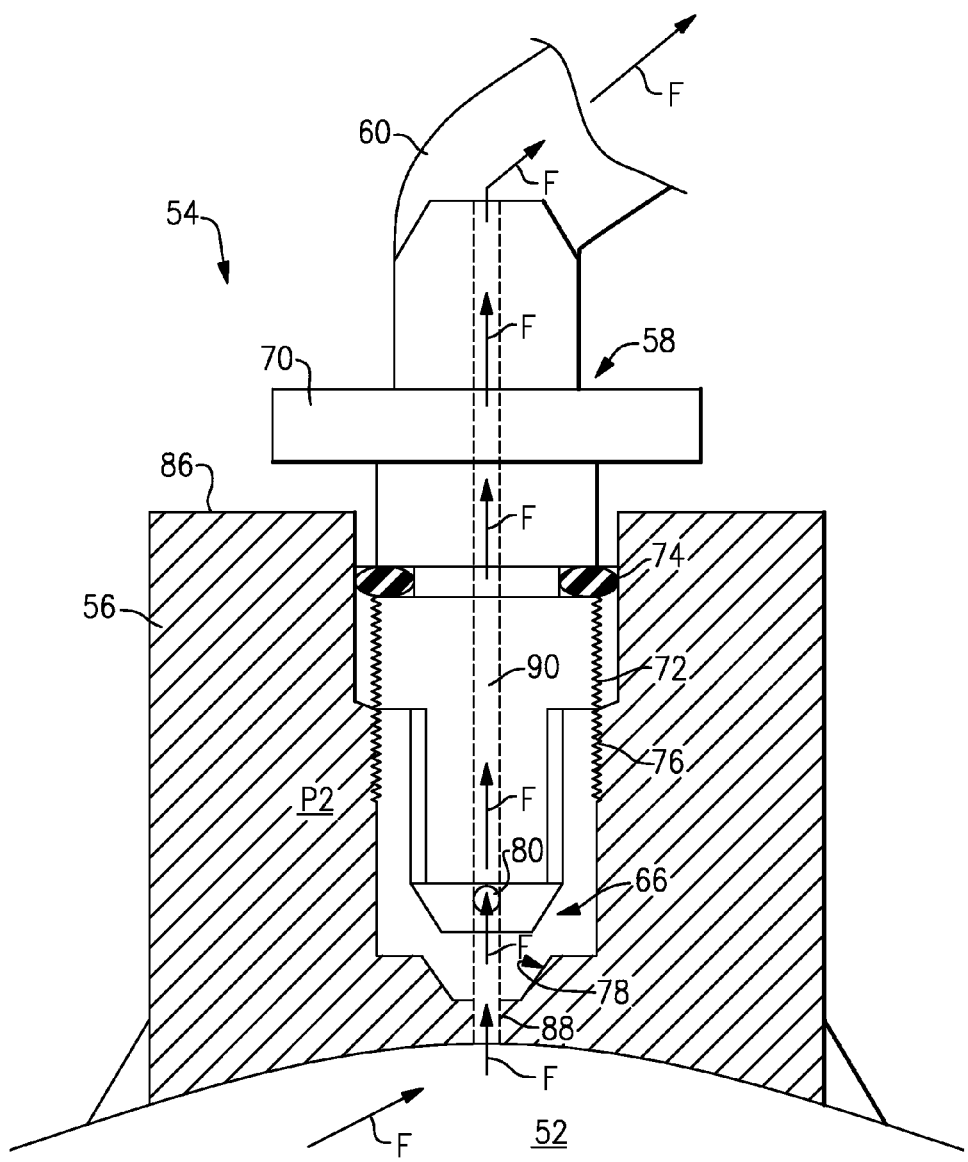

FIGS. 4A and 4B illustrate cross-sectional views of an exemplary bleed valve assembly 54. The bleed adaptor 58 of the bleed valve assembly 54 includes an adaptor body 62 that extends along a longitudinal axis 64 between an inlet portion 66 and a fitting 68 that is opposite from the inlet portion 66. The bleed adaptor 58 may additionally include a nut 70 and a threaded portion 72 disposed between the inlet portion 66 and the fitting 68. A seal 74 can be positioned between the nut 70 and the threaded portion 72 to seal between the bleed adaptor 58 and the tube boss 56. In one embodiment, the threaded portion 72 of the bleed adaptor 58 is received by a corresponding threaded portion 76 of the tube boss 56 to secure the bleed adaptor 58 to the tube boss 56.

At least one bleed opening 80 is formed in the adaptor body 62. In one embodiment, the bleed opening 80 is disposed on the inlet portion 66 of the bleed adaptor 58. In another embodiment, the bleed opening 80 is a hole formed in a conical portion 82 of the inlet portion 66 of the bleed adaptor 58. The bleed opening 80 may be selectively exposed to a fluid F to direct the fluid F into the bleed adaptor 58 by moving the bleed adaptor 58 between a first position P1 (see FIG. 4A) and a second position P2 (see FIG. 4B), as further discussed below.

A hose 60 can be connected to the fitting 68. In one embodiment, the hose 60 is a 37 degree flare hose, although other hoses or tubing may also be utilized. The hose 60 provides a conduit for carrying the fluid F that is removed from the tube portion 52.

The tube boss 56 of the bleed valve assembly 54 includes a bore 84 that receives the bleed adaptor 58. The tube boss 56 may also include a seat 78, located inside the bore 84, against which the bleed adaptor 58 is received to close the bleed valve assembly 54. In one embodiment, the seat 78 is conical shaped, although other shapes are also contemplated. In another embodiment, the seat 78 is shaped to accommodate the inlet portion 66 of the bleed adaptor 58.

A first position P1 of the bleed valve assembly 54 is illustrated in FIG. 4A. In the first position P1, the inlet portion 66 of the bleed adaptor 58 is received against the seat 78 of the tube boss 56 to substantially close the bleed valve assembly 54. The bleed adaptor 58 may be fully tightened (i.e., torqued) relative to the tube boss 56 in the first position P1 such that the nut 70 rests against an outer surface 86 of the tube boss 56. Fluid F, such as air, mist and/or fuel, inside of the tube portion 52 is blocked from entering the bleed adaptor 58 in the first position P1.

FIG. 4B illustrates a second position P2 of the bleed valve assembly 54. In the second position P2, the inlet portion 66 of the bleed adaptor 58 is moved such that it is spaced from the seat 78 of the tube boss 56, thereby selectively exposing the bleed opening 80 to the fluid F. The bleed valve assembly 54 can be positioned in the second position P2 by loosening the bleed adaptor 58 relative to the tube boss 56 to retract the threaded portion 72 of the bleed adaptor 58 from the corresponding threaded portion 76 of the tube boss 56. The nut 70 is spaced from the outer surface 86 of the tube boss 56 in the second position P2. In the open, second position P2, the fluid F may be communicated through a passage 88 of the tube boss 56, then through the bleed opening 80 and into a passage 90 that extends longitudinally through the bleed adaptor 58, before exiting the bleed valve assembly 54 through the hose 60.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A gas turbine engine, comprising:
a fan including a plurality of fan blades;
a compressor section;
a combustor section in fluid communication with said compressor section;
a turbine section driving said fan, the combustor in fluid communication with said turbine section;
a tubing system that circulates a fluid between a fuel tank and said combustor section;
a bleed valve assembly mounted to at least one tube portion of said tubing system; and
said bleed valve assembly including a tube boss mounted to said at least one tube portion of said tubing system and a bleed adaptor connected to said tube boss, said tube boss defining a bore and a first passage, said bleed adaptor received in said bore, said first passage interconnecting said at least one tube portion and said bore, said bleed adaptor movable between a first position and a second position relative to said bore of said tube boss to expose a bleed opening of said bleed adaptor to the fluid inside said at least one tube portion, wherein the fluid includes fuel.

2. The gas turbine engine as recited in claim 1, wherein an inlet portion of said bleed adaptor is received against a seat of said tube boss in said first position and is spaced from said seat in said second position.

3. The gas turbine engine as recited in claim 2, wherein said bleed adaptor is threadably connected to said tube boss.

4. The gas turbine engine as recited in claim 3, wherein said bleed opening is disposed on said inlet portion of said bleed adaptor, said bleed opening in communication with a fluid passage extending longitudinally through said bleed adaptor, and said inlet portion slopes inwardly toward an end of said bleed adaptor.

5. The gas turbine engine as recited in claim 1, wherein said bleed opening is disposed on an inlet portion of said bleed adaptor.

6. The gas turbine engine as recited in claim 1, comprising a hose connected to said bleed adaptor on an opposite side from said tube boss.

7. A method of bleeding fluid from a tubing system, comprising:
selectively exposing a bleed opening of a bleed adaptor that is connected to a tube portion of the tubing system, said tubing system in communication with a combustor section of a gas turbine engine and with a fuel tank;

communicating fluid from inside of the tube portion into the bleed opening to remove the fluid from the tube portion, wherein the fluid includes fuel; and communicating the fluid through the bleed adaptor and then through a hose connected to the bleed adaptor.

8. The method as recited in claim 7, wherein the step of selectively exposing includes:

moving the bleed adaptor from a first position in which the bleed adaptor is received against a seat of a tube boss mounted to the tube portion and a second position in which the bleed adaptor is spaced from the seat.

9. The method as recited in claim 7, wherein the step of communicating includes:

directing the fluid from the tube portion, through the bleed opening, and into a passage of the bleed adaptor.

10. A fuel bleed system for a gas turbine engine, comprising:

at least one tube portion that circulates fluid between a fuel tank and a combustor section of a gas turbine engine; and a bleed valve assembly comprising:

a tube boss mounted to said at least one tube portion, said tube boss defining a bore and a first passage that interconnects said at least one tube portion and said bore; and a bleed adaptor received in said bore, said bleed adaptor movable between a first position and a second position relative to said bore, said first position blocking flow of the fluid from inside said at least one tube portion into a bleed opening of said bleed adaptor, and said second position exposing said bleed opening to the fluid inside said at least one tube portion, wherein the fluid includes fuel.

11. The fuel bleed system as recited in claim 10, wherein said bleed adaptor includes an inlet portion, a fitting opposite said inlet portion, and an adaptor body that extends between said inlet portion and said fitting, said bleed opening disposed on said adaptor body, and wherein said bleed opening is exposed in said second position such that the fluid is directed from said at least one tube portion, through said first passage, into said bore and then into said bleed adaptor.

12. The bleed valve assembly as recited in claim 11, wherein said inlet portion of said bleed adaptor is moveable away from a seat of said tube boss to expose said bleed opening.

13. The fuel bleed system as recited in claim 11, comprising a hose connected to said fitting.

14. The fuel bleed system as recited in claim 11, comprising a nut and a threaded portion between said inlet portion and said fitting.

15. The fuel bleed system as recited in claim 14, comprising a seal between said nut and said threaded portion.

16. The fuel bleed system as recited in claim 11, wherein said inlet portion of said bleed adaptor is received against a seat of said tube boss to prevent said fluid from entering said bleed adaptor.

17. The fuel bleed system as recited in claim 16, wherein said bleed opening is disposed on said inlet portion.

18. The fuel bleed system as recited in claim 16, wherein said inlet portion of said bleed adaptor is spaced from said seat when said bleed adaptor is located in said second position such that fluid is directed from said at least one tube portion into said bleed opening, and said seat has a conical shaped geometry.

19. The bleed valve assembly as recited in claim 10, wherein said bleed adaptor is threadably received by said tube boss.

* * * * *